Feb. 9, 1932.  J. G. THARP  1,844,232
GLARE SHIELD FOR PERSONAL WEAR
Filed Nov. 17, 1930
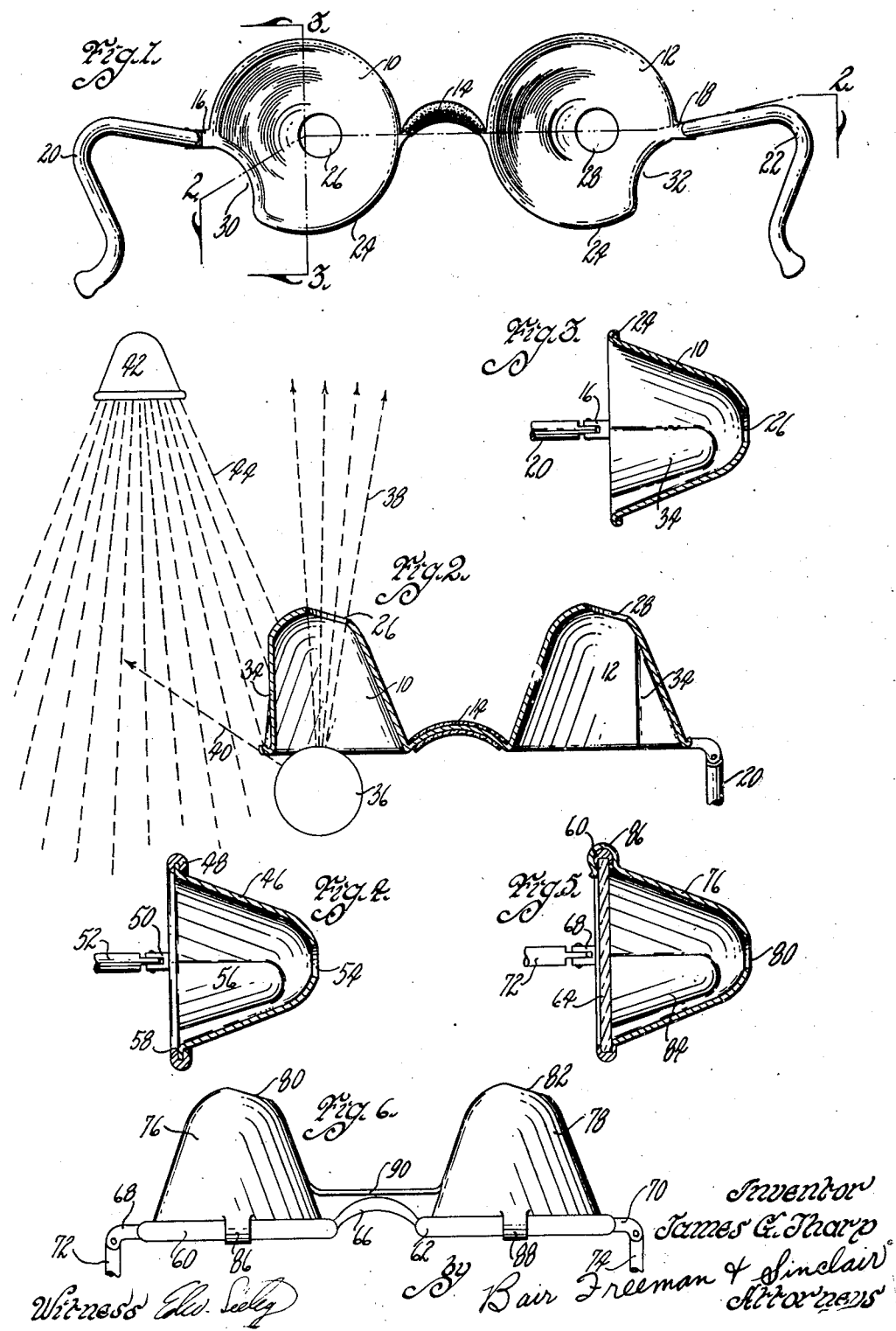

Patented Feb. 9, 1932

1,844,232

UNITED STATES PATENT OFFICE

JAMES G. THARP, OF INDIANOLA, IOWA

GLARE SHIELD FOR PERSONAL WEAR

Application filed November 17, 1930. Serial No. 496,176.

The object of this invention is to provide improved glare shields adapted for personal wear after the manner of spectacles or glasses, and which are are light in weight and of small compass and capable of being easily and quickly assumed or taken off as occasion may require.

A further object of the invention is to provide improved glare shields composed of a pair of opaque substantially conical shield members with means for mounting the shield members before the eyes of a user, the shield members being provided with suitable sight apertures.

Another object of the invention is to provide improved glare shields for personal wear which are especially efficient for use by the driver of a motor vehicle for shielding his eyes from the sun or from approaching head lamps, and so arranged as not to interfere with the proper visual perception on the part of the user.

Still another object of the invention is to provide improved glare shields of the character described having means for permitting the driver readily to observe intersections of the road or other objects located at the sides of the road which he is traversing.

With these and other objects in view my invention consists in the construction, arrangement and combination of the various parts of my device, whereby the objects contemplated are attained, as hereinafter set forth, pointed out in my claims, and illustrated in the accompanying drawings, in which:

Figure 1 is a rear view of a pair of glare shields embodying one form of my invention.

Figure 2 is a horizontal section on the line 2—2 of Figure 1, this view also including diagrammatic representations delineating the method of use.

Figure 3 is a vertical section through one of the shield members on the line 3—3 of Figure 1.

Figure 4 is a view similar to Figure 3 and illustrating a modified form of the invention in which the glare shields are carried by frame members of the type ordinarily employed for spectacles.

Figure 5 is a similar view of a further modified form in which the glare shields are used in connection with and are supported by a pair of ordinary spectacles.

Figure 6 is a plan view of the form of glare shield shown in Figure 5.

In each form of the invention I employ a pair of opaque shield members of substantially conical form and the different modifications of the invention refer particularly to different methods of mounting or supporting the shield members directly in front of the eyes of the user who would generally be the driver of a motor vehicle; although it is to be understood that the device may be used in any situation where it is desirable to shield the eyes from excessive light and yet permit visual perception on the part of the user.

The shield members may be formed of any suitable material of light weight which preferably is opaque, or at any rate sufficiently opaque to shield the eyes from the glare of head lamps or of the sun. This material may be aluminum or other suitable sheet metal or other material of a suitable character permitting it to be shaped to the desired form.

In the form of the invention according to Figures 1, 2 and 3, the shield members are designated generally by the numerals 10 and 12. These shield members are of generally conical form and are adapted to be supported, one in front of each eye of the user, with the base portions near the face.

The shield members 10 and 12, as before stated, are of generally conical form but are more or less truncated or blunted at the apical portions which preferably are rounded or formed on suitable concavo-convex curves as illustrated for instance in Figure 3.

In this form of the invention the shield members 10 and 12 are connected directly by a cross bar 14 which in this instance is shaped like the nose piece of spectacles and is adapted to rest on the bridge of the nose. At their outer margins the shield members are formed with projecting ears 16 and 18 to which riding bows 20 and 22 are pivotally connected. In this manner the glare devices may be worn by the user in a manner similar to the use of the ordinary spectacles or goggles.

The shield members 10 and 12 preferably are formed at their base margins with beads or rolls 24 to strengthen the metal against bending and to provide a finished edge.

The shield members 10 and 12 also are formed in their apical portions with substantially circular sight openings 26 and 28 respectively. These sight openings preferably are located somewhat to one side of the apical center of each shield member in order to more effectively shield the eyes of the user and at the same time permit him to properly view that side of the road over which he is driving. As here shown, the sight openings are located to the right of the apical centers of the shield members as required for use in a locality where the customs and laws prescribe driving of vehicles on the right hand side of the road.

Inasmuch as the shield members 10 and 12 are opaque or substantially opaque and are located close to the eyes of the user, thus substantially shutting off his vision except through the limited area outlined through the sight openings 26 and 28, it is desirable to provide means permitting the user to look sidewise on occasion, as for viewing road intersections which he may be approaching or for looking at objects located at the sides of the road on which he is driving.

For this purpose I have provided lateral sight openings located at the outer margins of and just below the horizontal diametrical line of each shield member. These lateral sight openings are designated by the numerals 30 and 32 respectively.

The lateral sight openings 30 and 32 may be in the form of notches or depressions in the base marginal portions of the shield members 10 and 12, and these depressions preferably are extended along the outer surface of the conical walls so as to give greater effectiveness to the use of these openings by permitting the user to glance laterally without being required to turn his head. One of the segmental depressions in the side wall of a shield member is shown particularly in Figure 3 and is designated by the numeral 34.

In Figure 2 the use and advantage of the glare shield device is illustrated in more or less diagrammatical manner. In this view the circle 36 represents the approximate location of one of the eye balls of the user and the broken lines 38 radiating therefrom illustrate the lines of sight through the sight aperture 26 in viewing the road directly in front of the driver or more especially that portion of the road over which he is driving, which in this instance would be the right hand side. The broken line 40 represents the line of sight through the lateral sight opening 30 for viewing an intersection or laterally located object, which is accomplished merely by rolling the eye ball laterally, in this instance to the left. The numeral 42 represents the head lamp of a vehicle located in front of and slightly to the left of the driver and the broken lines 44 represent rays of light emanating from said lamp. It will be noted that some of these rays of light impinge upon the shield member 10 and particularly upon the left hand side thereof, thus effectively screening the rays of light from the eyes of the user of the shield device.

It will be apparent, therefore, that I have provided a shield device which is very effective in intercepting rays of light which would interfere with proper driving operations and that the shield device also permits the proper visual perception, on the part of the user, of that part of the road over which he is driving and also objects located at the sides. In other words, the driver is enabled to see clearly the road in front of him and also any intersections at either side of the road, thus adding greatly to the safety and security of the vehicle and its occupants.

In the form of the device illustrated in Figure 4, the shield devices such as 46 (one of which is shown) are carried by a pair of spectacle frames similar to the frames of ordinary spectacles or goggles. The frame is designated generally by the numeral 48 which here illustrates one of the circular or substantially circular frames such as are usually employed for carrying lenses. It is to be understood that a pair of these substantially circular frame members will be employed and that each will support one of the shield members such as 46 and will be connected by the ordinary nose piece, not shown, of the character illustrated by the cross bar 14 in Figure 1.

Each frame member 48 may be provided with a laterally extending ear 50 at its outer margin to which a riding bow 52 is pivotally attached.

Each shield member 46 is provided with a substantially central sight opening as designated by the numeral 54 and also with a lateral segmental depression such as 56 on its outer face.

The shield members 56 may be formed at their base margins with outturned flanges 58 seated in grooves or rabbets in the frame members 48.

In the form shown in Figures 5 and 6 the shield devices are designed to be used in connection with a pair of spectacles and are particularly adapted for use by a person who is under the necessity of wearing his eye glasses while driving. The use of the eye glasses would probably interfere with the use of shield devices of the character shown in Figures 1 to 4 inclusive, and I have therefore provided a modified form of the shield device which may be mounted directly on the usual eye glasses as shown.

In this form of the device the spectacle frames are designated by the numerals 60 and 62 and these frames carry lenses 64 and are connected by the usual nose piece 66. The frame members 60 and 62 are formed with the outwardly projecting ears 68 and 70 to which riding bows 72 and 74 are pivotally attached.

A pair of shield devices 76 and 78 are employed and these shield devices are of the same shape and other characteristics as those previously described except as herein noted.

These shield members are formed with substantially central sight openings 80 and 82 respectively and also are provided with the lateral segmental depressions such as 84 on their outer walls.

The shield members 76 and 78 in this instance are formed at their upper margins with hook members 86 and 88 respectively, which hook members are adapted to engage over the frame members 60 and 62 for supporting the shield members in front of the respective lenses of the spectacles. In this manner the shield members are removably carried by the spectacles themselves and may be removed and replaced at pleasure.

In order to make the shield devices a unitary structure, the shield members 76 and 78 may be connected by a cross bar 90 which would be so located as not to interfere with the nose piece 66 of the spectacles.

Either form of the shield device is small, compact and of light weight and is very easily and quickly removed and replaced, or in other words assumed or laid aside by the user. Each form is of such size and character that it can be readily carried in the pocket of a garment or in an easily accessible part of the vehicle and is, therefore, of great utility because it can readily be arranged so that it will always be at hand when wanted and yet is capable of being placed entirely out of the way when not in use.

Furthermore, the device according to each form of my invention is inexpensive and is also durable and has no parts which would readily break or become distorted under ordinary conditions of use.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. A glare shield device comprising a pair of shield members of generally conical form, each member being formed with a sight opening adjacent its apex, each shield member each member being formed with a sight opening at its outer margin separated from the apical sight opening by a portion of the wall of said member, and means for supporting said members in front of and close to the eyes of a user.

2. A glare shield device for personal wear comprising a pair of substantially opaque shield members of substantially conical shape, each shield member being formed with a restricted sight opening in its apical portion, each shield member also being formed with a segmental depression on its wall extending from the base toward the apex of the cone, and means for supporting said shield members in front of the eyes.

JAMES G. THARP.